United States Patent [19]
Del Monico et al.

[11] Patent Number: 5,028,088
[45] Date of Patent: Jul. 2, 1991

[54] COLLAPSIBLE MOBILITY SHELTER FOR MOUNTING ON A VEHICLE

[76] Inventors: Don Del Monico; Dolly Del Monico, both of 862 Lugo Ave., Coral Gables, Fla. 33156

[21] Appl. No.: 543,102

[22] Filed: Jun. 25, 1990

[51] Int. Cl.$^5$ .............................................. B60P 3/32
[52] U.S. Cl. ....................................... 296/27; 296/26; 296/171
[58] Field of Search ............... 296/26, 27, 171; 52/66, 52/67

[56] References Cited

U.S. PATENT DOCUMENTS

| | | | |
|---|---|---|---|
| 3,000,664 | 9/1961 | Martin | 296/26 |
| 3,447,831 | 6/1968 | Wagner | 296/27 |
| 3,463,541 | 8/1969 | Garrison | 296/26 |
| 3,652,119 | 3/1972 | Hall | 296/27 |
| 4,261,614 | 4/1981 | Rice | 296/171 |
| 4,603,901 | 8/1986 | McIntosh et al. | 296/26 |

Primary Examiner—Robert R. Song
Attorney, Agent, or Firm—Malloy, Downey & Malloy

[57] ABSTRACT

A collapsible mobility shelter specifically designed to be mounted on the bed of a truck such as a military vehicle and including a bottom wall portion having surrounding side walls and a top portion mounted thereon selectively positionable between either a collapsed position or an upstanding, operable position. The operable position is defined such that increased height and interior volume of a mobile shelter is provided wherein the shelter is mounted on the vehicle and has the versatility of being selectively connected into the aforementioned collapsed position for extended transport of the vehicle on an aircraft or other means of shipment.

20 Claims, 6 Drawing Sheets

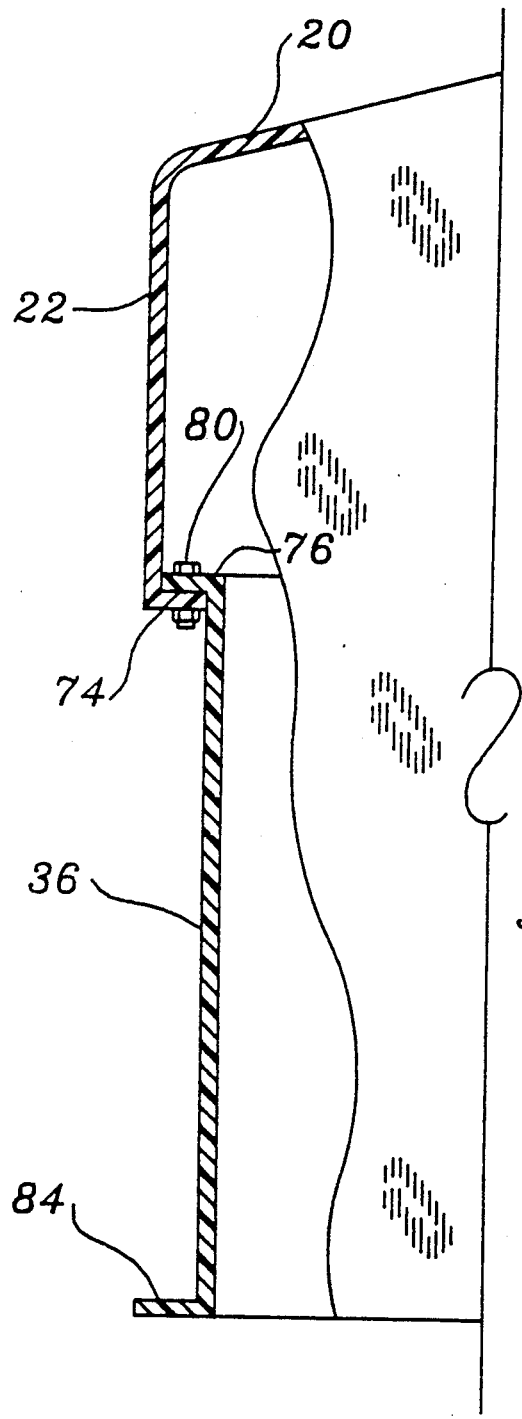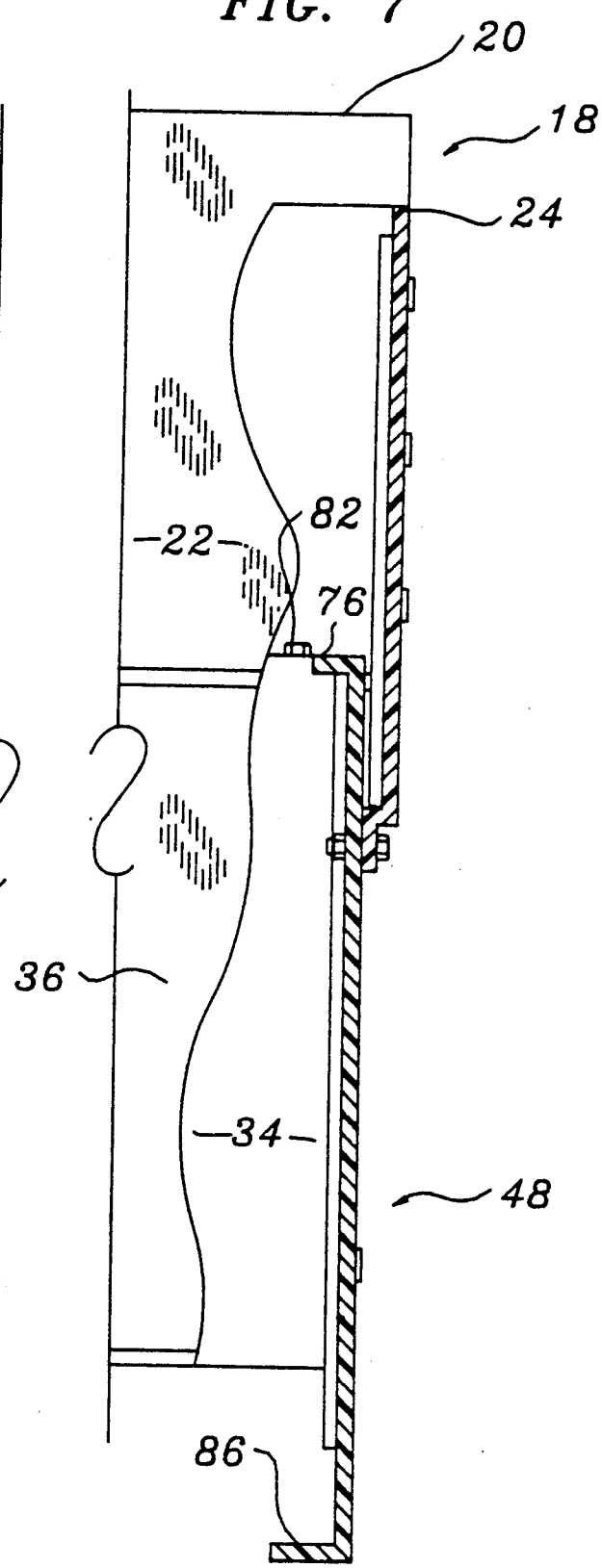

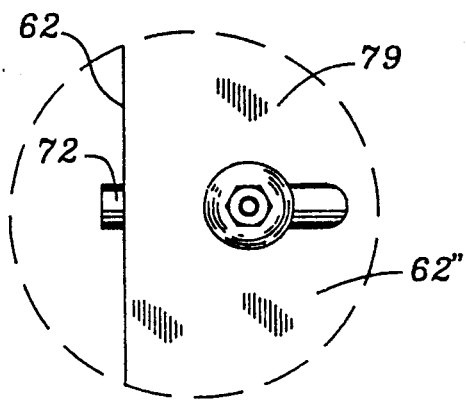
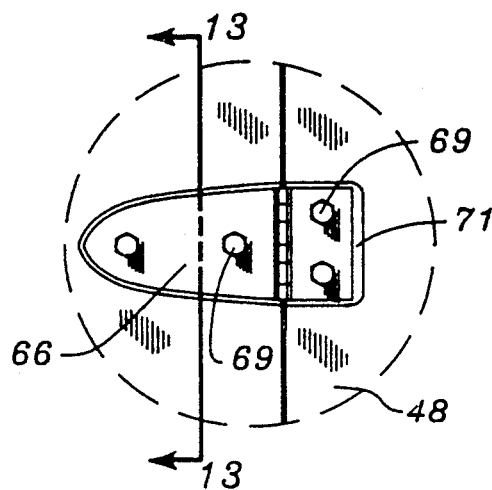
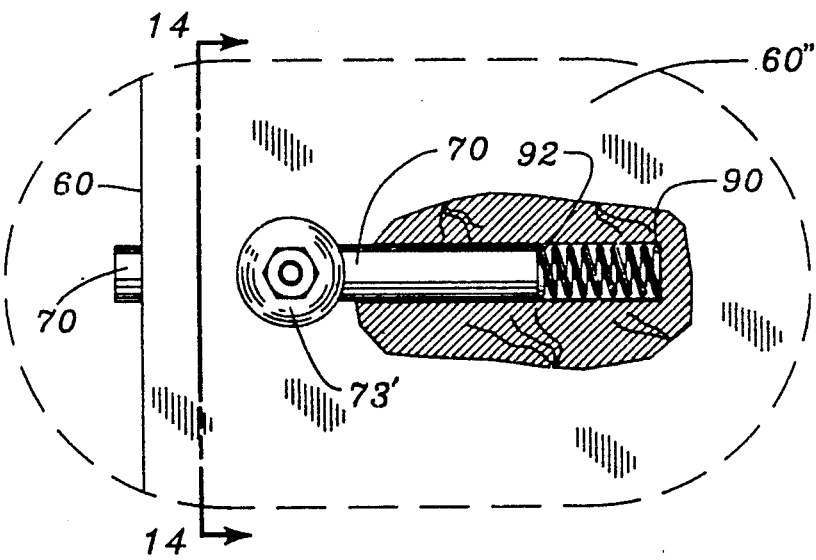
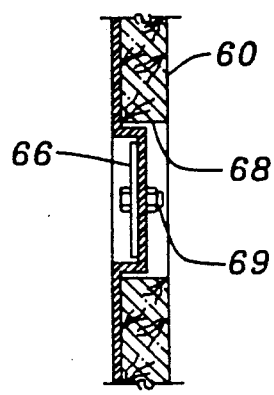
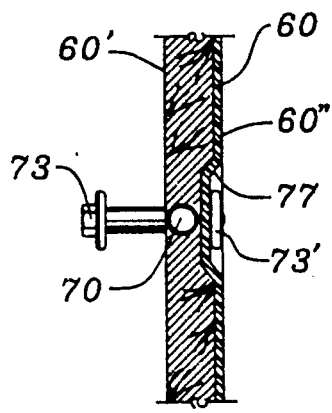

COLLAPSIBLE MOBILITY SHELTER FOR MOUNTING ON A VEHICLE

BACKGROUND OF THE INVENTION

1. Field of the Invention

A mobile shelter assembly capable of being mounted on the bed of a truck and wherein components of the shelter assembly are structured for selective attachment in either a collapsed position, primarily used during transport of the vehicle, or an operable position, normally used when the vehicle is not being transported.

2. Description of the Prior Art

It is recognized that vehicles exist in the prior art which are structured to be "modified" to the extent that certain portions of the vehicle may be expanded or contracted for purposes of changing the overall dimension and configuration of the vehicle dependent on its intended use and for purposes of travel.

For example, Norkus, Jr., U.S. Pat. No. 4,392,682, discloses a cargo truck trailer having a telescoped box-like top and a bottom portion cooperatively interconnected through a mechanism operated from a single control station. The mechanism will serve to raise or lower the top portion relative to the bottom portion in order to provide maximum cargo space. The top or roof portion is guided by ribs or struts of the bottom body portion and the aforementioned control mechanism used to raise the top relative to the bottom is in the form of a crank mechanism which drives gears and chains to simultaneously rotate a plurality of vertical screw rods at the corners and mid-section of the body. Norkus, Jr. further shows an access door or tail gate supported on telescoped tracks which accommodate the raising or lowering of the top body so that the cargo carrying interior may be completely closed regardless of the selected height of the overall vehicle. While operable for its intended function, the mechanism associated with the selective positioning of the top and bottom portions relative to one another in the Norkus, Jr. patent appears to be relatively complex and of questionable adaptability to existing commercial vehicles without encountering prohibitive expense in initial manufacture and/or maintenance thereof.

The patent to Marole, U.S. Pat. No. 2,756,094, discloses a collapsible trailer which has various components including top, bottom, and side wall portions which are movable relative to one another to expand the height, length, and accordingly the overall interior dimension. Similarly, the patent to Hulsev. U.S. Pat. No. 4,017,116, discloses a recreational vehicle or travel trailer including open top box-type body sections provided with rigid forward and aft covered sections movable relative to one another between collapsed and extended positions. A roof is provided for the body when the cover sections are collapsed for towing of the trailer and when they are extended to an open trailer for camping. One problem associated with many prior art vehicles is the generally complicated mechanical means used to accomplish relative movement and/or support of the individual components of the vehicle as such components are selectively positioned between a collapsed and/or operable position. In the Hulsev patent, a plurality of arms which are pivotally mounted serve to support and/or attend to the movement of the components relative to one another.

Fillios, U.S. Pat. No. 4,133,571, discloses an expandable camper body having an aft section which telescopes within a forward section and incorporates folding support tracks for guiding and supporting the aft section when extended outwardly, longitudinally relative to the other section or forward section to which it is attached. Hydraulic power is used for raising and lowering the support track and a powered gear mechanism serves to drive and extend and retract the aft section on the aforementioned tracks.

It is assumed that prior art structures of the type disclosed in the above-noted U.S. patents are operable for their intended use. However, a review of such structures indicate an overly complex nature of the control and/or positioning mechanisms utilized to accomplish the relative movements of the components or sections of the vehicle relative to one another as they move between a stored position and an outwardly extended position.

SUMMARY OF THE INVENTION

This invention relates to a collapsible shelter assembly of the type specifically designed to be mounted on the bed portion of a truck or like vehicle and particularly a military vehicle. The assembly includes a bottom wall portion preferably having two elongated side walls and a front wall portion and an open back or rear end. The bottom wall portion further includes an open upper top along its entire length.

A top portion is disposed in covering relation to the open top and, accordingly, has an open bottom for somewhat telescopic covering or fitting relation over the bottom wall portion once the bottom wall portion is secured to the bed of a truck. The top portion is adjustably attached to the bottom wall portion so as to be oriented in two positions. These two positions may be defined as an upwardly extended operable position or a collapsed position. The collapsed position may also be considered a somewhat stored orientation of the bottom wall portion and top or roof portion and is primarily intended when the vehicle on which the assembly is mounted is prepared for extended transport. The collapsed position is particularly suited for transport of the vehicle on a C-130 military aircraft wherein the overall height of the vehicle is decreased to provide sufficient clearance when loading and unloading the vehicles on and off the aircraft. To the contrary, the operable position is defined by the top or roof portion being secured to the bottom wall portion substantially adjacent a correspondingly positioned periphery of both the open top of the bottom wall portion and the open bottom of the top or roof portion. When in the aforementioned operable position, the interior of the assembly is, of course, increased due to the extended height of the assembly when connected in the manner above set forth.

An attachment means is provided in the form of at least a first flange extending about the periphery of the open bottom of the top portion and substantially along the entire length thereof. This first flange is designed to abuttingly engage and/or confront a second flange formed along the periphery of the open top of the bottom wall portion. Conventional connectors such as nut and bolt type fasteners may be provided to connect the flanges and extend in spaced relation to one another along a major portion of their length. An attachment means further comprises a third flange secured to and extending outwardly from a lowermost peripheral edge of the bottom wall portion. This third flange is disposed to confrontingly engage the bed of the truck or any upstanding side walls or components of the bed which are typically associated with the vehicle.

Another important feature of the subject assembly is the provision of a rear panel or bulkhead type structure secured in covering relation to the open rear end of the bottom wall portion and structured to cooperate with a rear panel fixedly formed on the top portion and extending downwardly therefrom. Both the top panel of the top portion and the rear panel attached in covering relation to the open rear end of the bottom wall portion include door opening segments formed therein. Further, a door means is provided in the form of two separate independently mountable door members A first door member is pivotally secured in covering relation to the door opening in the roof portion. A second door structure or member is pivotally secured so as to cover the door opening in the rear panel. These two door openings are disposed in somewhat aligned relation with one another and also in a preferred embodiment, to be described in greater detail, the door opening formed in the top portion is somewhat wider. In further addition, each of the doors are pivotally connected by recessed hinges or like recessed mounting structures along opposite longitudinal edges thereof so that each door pivots outwardly from its closed and covering relation to the respective door opening from a different or oppositely disposed longitudinal edge. The different widths of the door opening, therefore, allow the door structures to be opened whether the top portion is mounted on the bottom wall portion in either an operable position or a collapsed position. This, in turn, provides free access to the interior of the assembly.

In addition, the fact that the rear or back panel or bulkhead may be completely detached from its covering relation to the rear end of the bottom wall portion facilitates the loading of rather large or bulky cargo or objects which would not normally fit through the door openings.

Other features associated with the advantages of the subject assembly is the ability to transfer the entire assembly to a different truck without significant structural modification thereof or the disassembly of the individual components relative to one another.

BRIEF DESCRIPTION OF THE DRAWINGS

For a further understanding of the nature of the present invention, reference is had to the following detailed description taken in connection with the accompanying drawings in which:

FIG. 6 is a sectional view along line 6—6 of FIG. 4.
FIG. 7 is a sectional view along line 7—7 of FIG. 4.

FIG. 10 is a detailed view of a slide bolt assembly associated with the subject invention.

FIG. 11 is a detailed view as indicated in FIG. 7 of a recessed hinge structure.

FIG. 12 is a detailed view of a slide bolt associated with FIG. 7.

FIG. 13 is a sectional view taken along line 13—13 of FIG. 11.

FIG. 14 is a detailed view taken along line 14—14 of FIG. 12.

Like reference numerals refer to like parts throughout the several views of the drawings.

DETAILED DESCRIPTION OF THE PREFERRED EMBODIMENT

Figure 1:
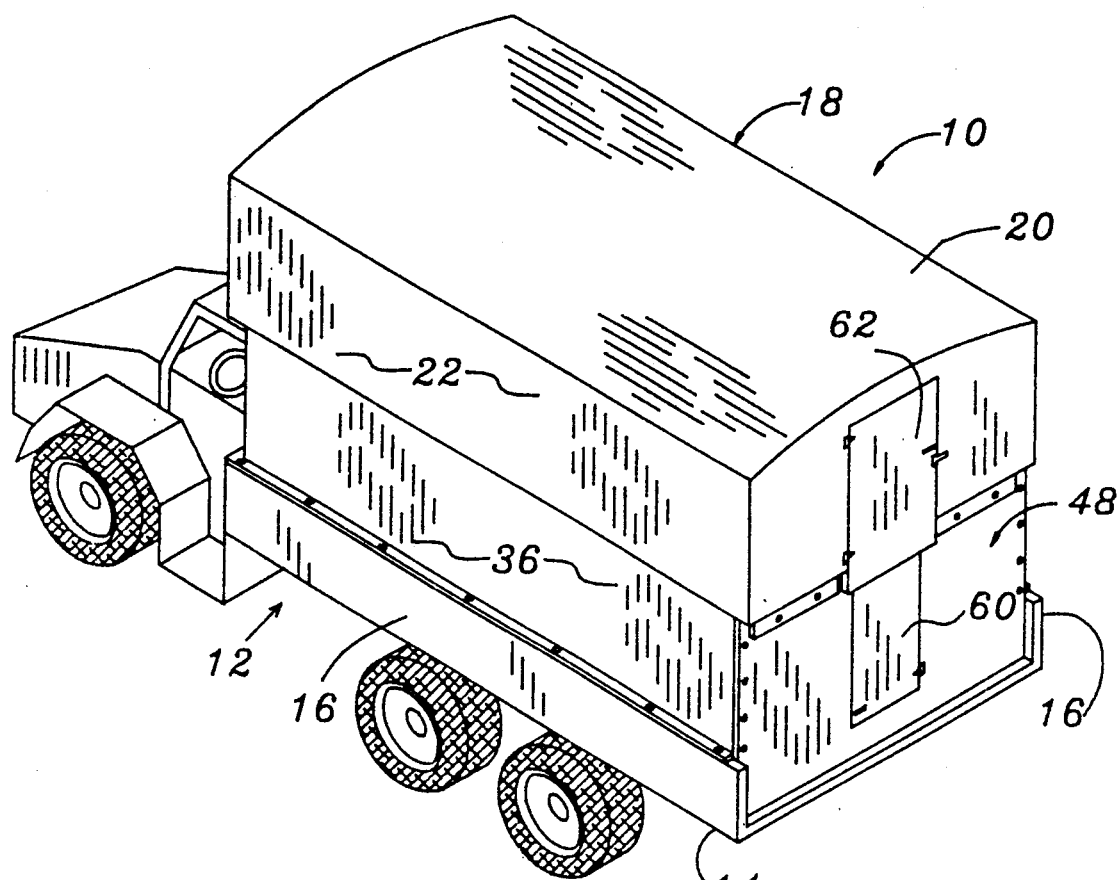
FIG. 1 is a perspective view of the subject assembly mounted on a truck-like vehicle in an operable position.
Figure 2:
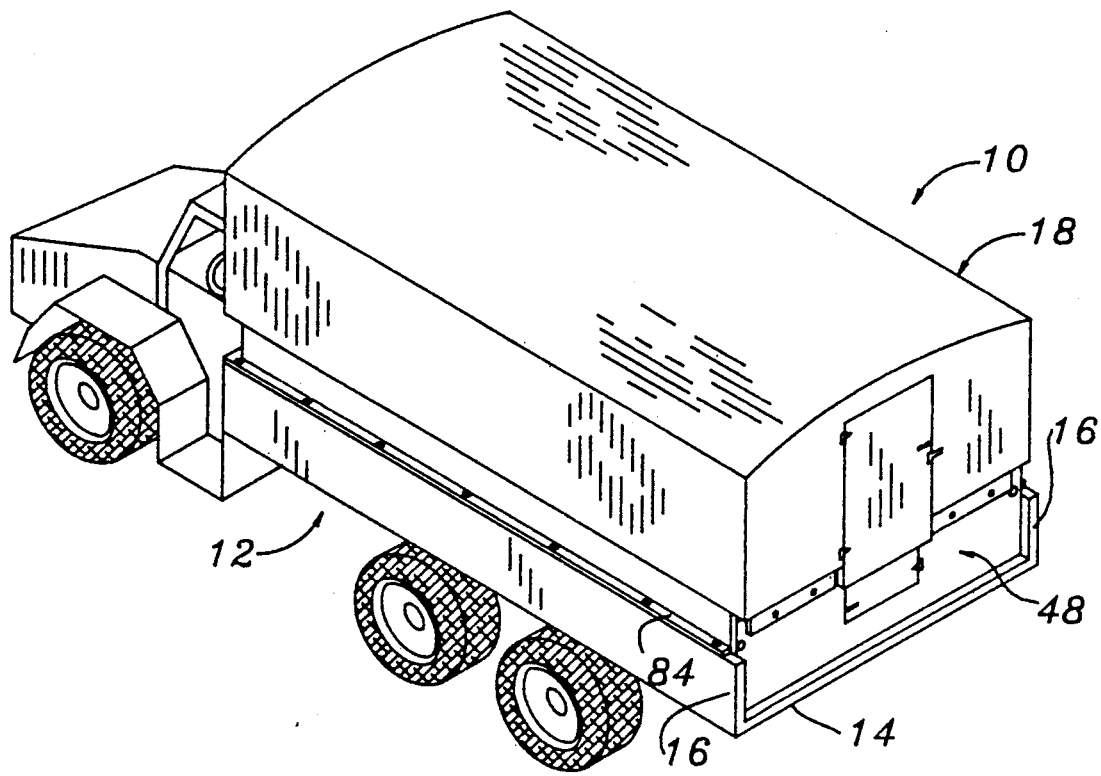
FIG. 2 is a perspective view of the assembly of the present invention oriented in a collapsed position.

As shown in the accompanying figures, the present invention is directed towards an adjustable shelter assembly generally indicated as 10 and of the type specifically adapted to be used in combination with a truck or like vehicle generally indicated as 12 such as but not limited to a military vehicle. More specifically, the shelter assembly 10 is designed to be mounted on what may be generally referred to as the bed portion 14 of the vehicle 12. The bed 14 of the vehicle 12 may be a flat bed or have at least minimally outstanding side walls as at 16. As will be explained in greater detail hereinafter, the assembly 10 is capable of being selectively oriented in either an outwardly extending operable position as shown in FIG. 1 or a collapsed position as shown in FIG. 2.

With reference to primarily FIGS. 3-8, the assembly 10 comprises a top portion 18 having a roof 20, depending side wall segments 22, and a back panel as at 24 extending downwardly from the roof 20 and preferably being fixedly secured to both the roof 20 and the side wall segments 22. The top portion 18 further comprises a front panel as at 25 (see FIG. 5).

Figure 3:
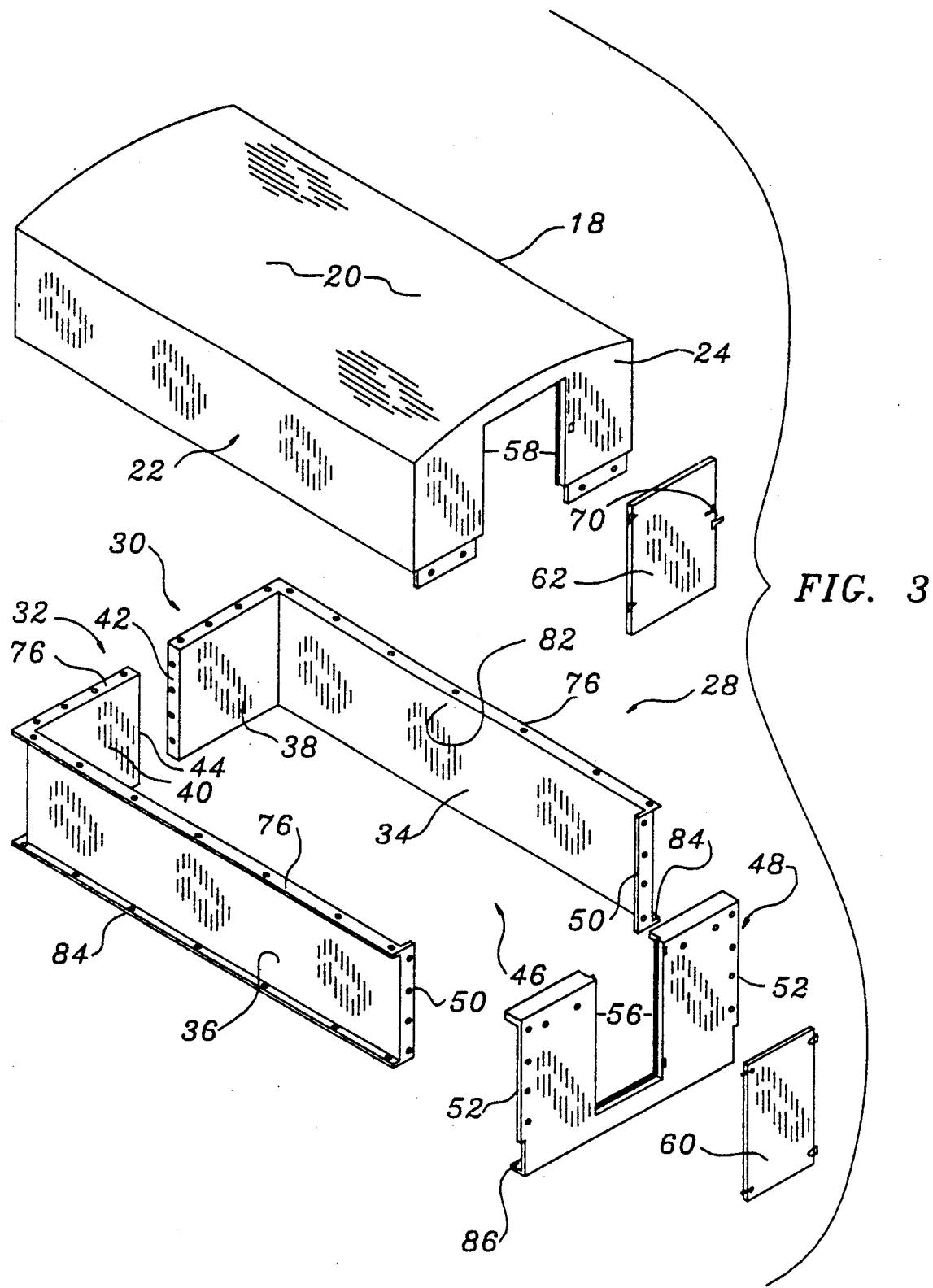
FIG. 3 is an exploded view showing the various components of the subject assembly in their relative operative positions to one another.
Figure 4:
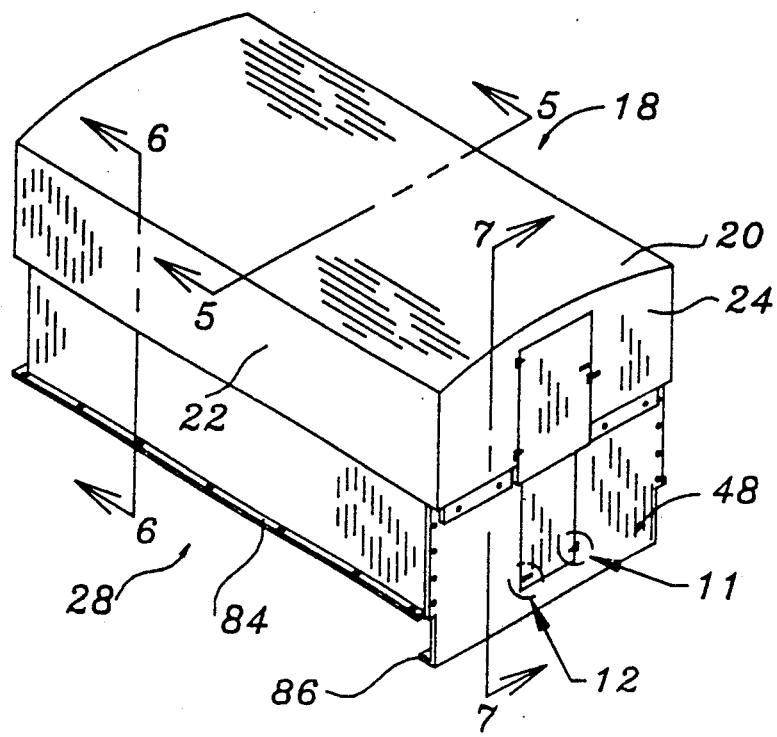
FIG. 4 is a perspective view of the subject assembly in an isolated view, removed from the truck-like vehicle.

The assembly 10 further comprises a bottom wall portion generally indicated as 28 preferably including two separable but connectable bottom wall segments 30 and 32, each having side wall segments as at 34 and 36 and front wall segments as at 38 and 40. The two segments 30 and 32 are adjoined together by conventional nut and bolt connectors or like applicable connector structures along correspondingly position ends 42 and 44 as best shown in FIG. 3. As shown, apertures are provided in each of the ends 42 and 44 through which the aforementioned connector structures may pass for removable attachment. The bottom wall has an open outer end generally indicated as 46 disposed to be mounted in general alignment with the rear end of the vehicle on which it is mounted. An end portion generally indicated as 48 is connected to the bottom wall portion by inwardly directed flanges 50 attached to longitudinal peripheral sides 52 by the same type of connectors as mentioned above.

The end portion 48 is thereby disposed in substantially covering relation to the opening 46 but may be removed therefrom when it is required to load the interior of the assembly 10 with cargo which would not normally pass through a door opening 56. The end portion 48 includes a flanged top edge 53 to provide structural rigidity to the entire rear bulkhead.

Figure 8:
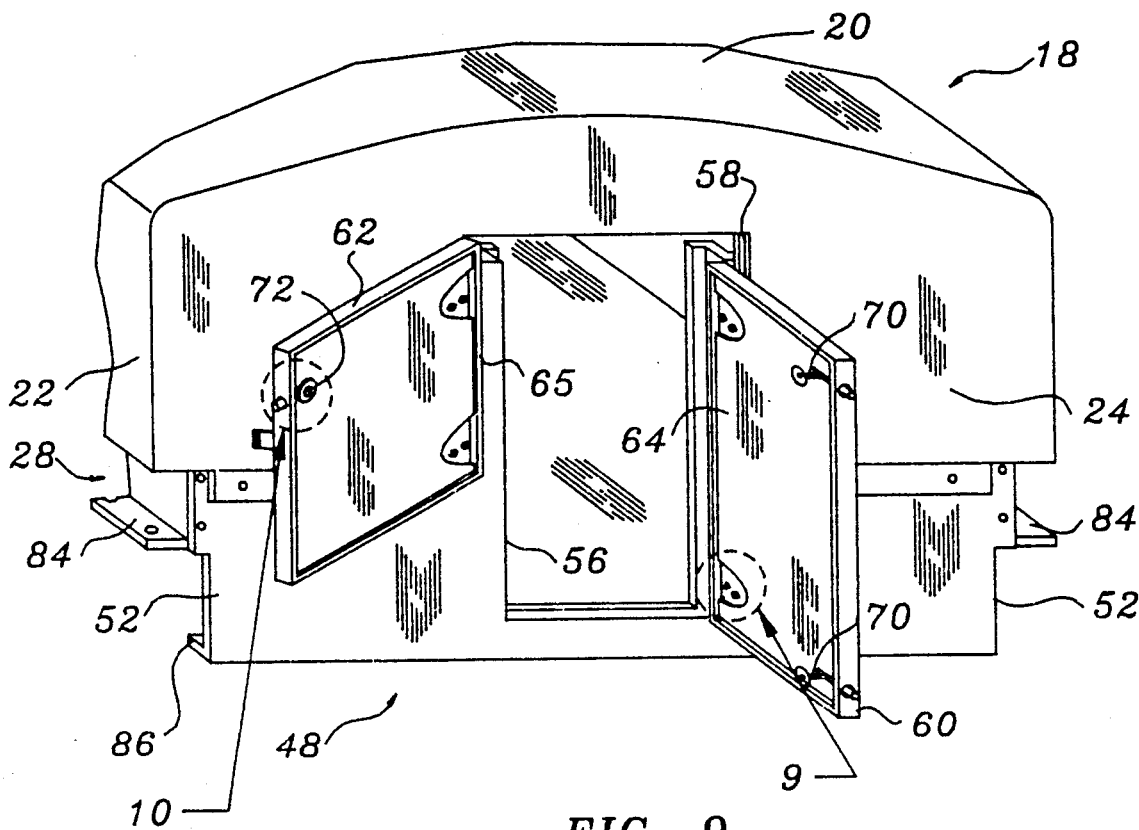
FIG. 8 is a perspective view in partial cutaway showing details of a door assembly associated with the present invention.

A door means is provided for entry into the interior of the assembly 10 and comprises the door segment 56 disposed in aligned relation with a door segment 58 formed in the end panel 24 of the top portion 18. As best shown in FIG. 8, the door means defined at least in part by the door openings 56 and 58, is formed in the outermost end of both the top portion 18 and the bottom wall portion 28. Further, the door means comprises two door structures 60 and 62 each hingedly connected along what may be referred to as an opposite longitudinal side of the door structures as at 64 and 65 in order that the door structures 60 and 62 swing outwardly in substantially outward direction in order to provide open access to the interior of the assembly. Another feature to be emphasized is that the door opening 58 is somewhat wider than the door opening 56. This allows the door structure 60 to swing open as well as the door structure 62 even when the assembly is in a collapsed position as shown in FIG. 8.

Figure 9:
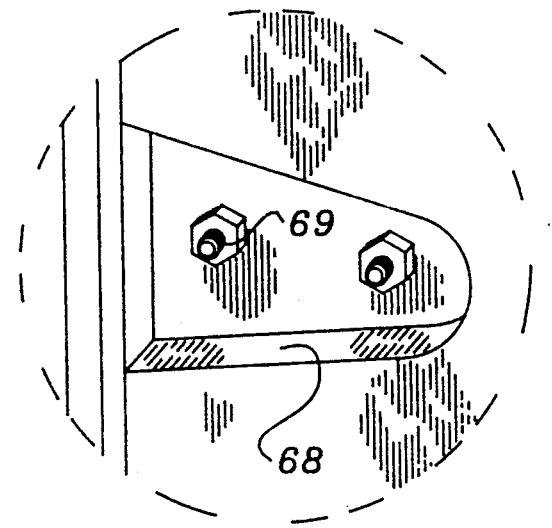
FIG. 9 is a detailed view of a hinge of a door structure in a recessed position.

With regard to FIGS. 8–14, it is important to note that the doors 60 and 62 each include specifically structured hinges and/or slide bolts indicated in greater detail hereinafter. Due to the relative movement of the doors in a somewhat overlying relation to one another, it is important that none of the above-noted hardware protrude outwardly to an extent that such hardware would interfere with the movement or positioning of the doors when the top cover 20 moves between the extended operable position or the collapsed stored position. With reference to FIGS. 9 and 11, a hinge plate 66 is mounted on the exterior of the door structure 60 but is recessed inwardly as clearly shown in FIG. 12 within recess 71. A connector 69 has its protruding head also within recess 71 and extends through the hinge plate 66 and protrudes outwardly therefrom but within the recess 68 formed on the opposite side of the door structure 60 (also see FIG. 9). The same recess 71 extends into the door frame defined on the rear bulk head 48. The same type of hinge structure is utilized on both doors 60 and 62, wherein the hinge plates 66 are mounted on the exterior of the door structure 60 as well as being mounted on the exterior surface of the door structure 62. Door structure 62 also has recesses 68 formed therein to accommodate the placement of the connectors 69 protruding outwardly from the opposite or inner face thereof.

Similarly, slide bolt structures or like locking devices 70 and 72 are mounted on the door structures 60 and 62, respectively, both at least being partially recessed so as to not interfere with the positioning or movement of the door structure 62 relative to the door 60 as the top cover 18 is positioned either in the extended operative position or stored in the collapsed position. As shown in FIGS. 12 and 14, the door structure 60 includes two slide bolts, each having an operative and manipulative handle as at 73 protruding outwardly from the inner surface 60' of the door structure 60. The opposite manipulative handle or knob on each of the two slide bolts as at 73' is mounted within a recess 77 formed in the outer surface 60" of the door structure 60. Therefore, there is no protruding hardware extending outwardly from the outer surface 60" of the door structure 60.

As shown in FIG. 12, each of the slid bolt structures 70 and 72 are fitted with a spring 90 in confronting engagement with an inner proximal end 92 of the slide bolt structures forcing the slide bolts outwardly into a normally locked position. In this manner, the doors 60 and 62 would normally remain locked when in the closed position, requiring sliding manipulation of the handle means 73, 73' in order to open the doors.

With regard to FIG. 10, the sliding bolt structure 72 is formed within the recess 79 formed in the inner surface 62" of the door structure 62.

Figure 5:
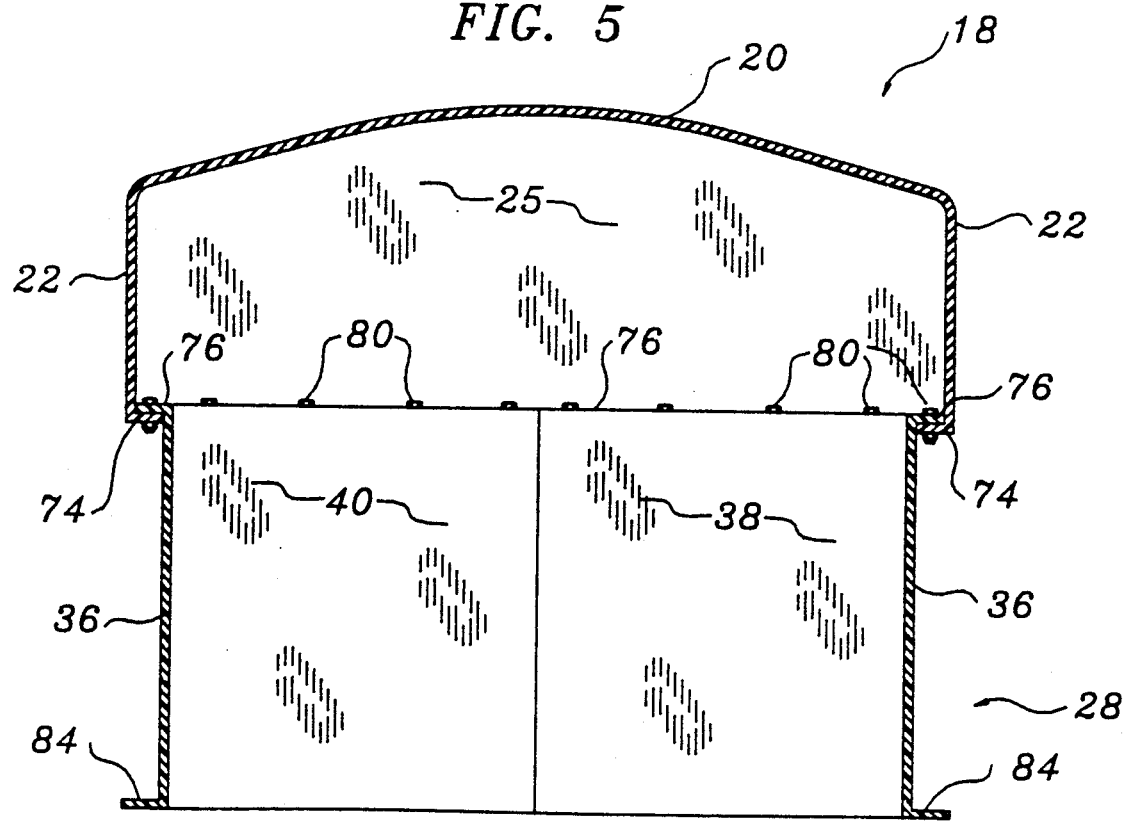
FIG. 5 is a sectional view along line 5—5 of FIG. 4.

Another important feature of the present invention is the provision of an attachment means used to secure the top portion 18 to the bottom wall portion 28. This attachment means comprises a first elongated substantially peripherally located flange 74 mounted on and extending along the length of the periphery of an open bottom of the top portion and extending substantially transversely inwardly towards the open bottom. The attachment means further comprises a second flange integrally formed on and extending along the length of the periphery of the open top of the bottom wall portion 28 and is indicated as at 76. As shown in FIGS. 3, 5, and 6, the flange 76 extends along both the side segments 34 and 36 as well as the front wall segments 40. The first and second flanges 74 and 76 are structured such that each include a plurality of spaced apart apertures which are alignable with one another. Through these apertures, a plurality of the aforementioned connector means, which could be nut and bolt type fasteners as at 80, are passed and connected to accomplish removable attachment of the first and second flanges to one another. The second flange 76 is also transversely oriented and extends outwardly away from the open top 82 of the bottom wall section 28. By virtue of the cooperative configurations and dispositions of the first and second flanges, they are removably secured to one another in confronting engagement when the top portion 18 is in the operable position relative to the bottom wall portion 28 as best shown in FIG. 5.

The attachment means of the present invention further comprises a third flange as at 84 extending along substantially the bottom periphery of the bottom wall portion 28 including both segments thereof 30 and 32. This third flange also extends transversely outward and away from the interior of the bottom wall section and is primarily disposed to be anchored by the appropriate connectors 80, to the bed and/or upwardly extending sidewalls 16 of the vehicle 12 as clearly shown in FIGS. 2 and 4. Yet another inwardly directed transversely oriented flange as at 86 may be mounted on the lowermost end of the end portion 48 in order to attend the securement of the end portion 48 to the bed 14 of the vehicle 12.

As further indicated, an additional fourth flange as at 83 is provided along the lower bottom edge of the back panel 24 of the top portion 18 and is specifically positioned to secure the lower edge as at 24' (see FIG. 7) to the end portion 48 by conventional connectors 80. As set forth above, FIG. 7 represents the cover or top 18 in a raised and operative position. The bolting or connection of the additional flange 83 to the rear bulk head or end portion 48 serves to accomplish an effective seal about the entire periphery between the top cover 18 and both the bottom wall portion 28 and the rear bulk head 48, respectively, except, of course, for the door openings as set forth above. Receiving apertures as at 81 for the connectors 80 are formed both in the flanges 83 and in the rear bulk head 48 in aligned relation to one another for ease of connection.

It should be apparent, therefore, that the positioning of the top structure 18 into a collapsed position merely entails disconnecting of the connectors 80 so as to separate the first and second flanges 74 and 76 from one another and separate the fourth flange 83 from its attachment to the rear bulk head 48. The top cover portion 18 may then be lowered into the collapsed position.

Now that the invention has been described,

1. A collapsible shelter adapted to be mounted on a bed of a truck or like vehicle, said assembly comprising:
   a bottom wall portion removably secured to the truck bed and extending upwardly therefrom and including an open outer end,
   an end portion secured to said open outer end of said bottom wall portion in substantially covering relation thereto,
   a top portion adjustably fitted in telescoping relation over an open top portion of said bottom wall portion being selectively positionable between a collapsed position and a raised, operable position,
   said collapsed position defined by overlapping, substantially telescoping and covering orientation of said top wall portion over said bottom wall portion with said top portion resting on said open top portion of said bottom wall portion,
   said operable position define by a peripheral portion of an open bottom of said top portion secured adjacent to a peripheral portion of said open top portion of said bottom wall portion with said top portion extending upwardly therefrom, and
   said operable position further defined by an increased height and interior volume of said combined bottom wall portion and top portion.

2. An assembly as in claim 1 further comprising attachment means mounted on both said bottom wall portion and top portion adjacent corresponding peripheral portions thereof and structured for removable connection of said bottom wall portion and said top wall portion to one another.

3. An assembly as in claim 2 wherein said attachment means comprises a first flange structure extending along a majority of a length of said peripheral portion of said top portion and disposed transversely to said open bottom portion thereof, said first flange structure removaly attachable to said peripheral portion of said bottom side wall portion.

4. An assembly as in claim 3 wherein said attachment means further comprises a second flange structure extending along a length of said peripheral portion of said bottom wall portion and disposed transversely to said open top portion thereof, said second flange structure removably attachable to said first flange structure of said top portion.

5. An assembly as in claim 4 wherein said first and second flanges are disposed in overlapping confronting engagement with one another along their lengths and said attachment means includes a plurality of connectors mounted removably secured to said first and said second flanges to one another.

6. An assembly as in claim 5 wherein said first flanges is directed inwardly towards said open bottom portion and said second flange is directed outwardly away from said open top portion, said first flange having an upper surface secured in confronting engagement with an under surface of said second flange.

7. An assembly as in claim 4 wherein said attachment means comprises a third flange secured to a bottom peripheral edge of said bottom wall portion and extending along a length thereof and extending outwardly therefrom and in engaging relation to the truck bed.

8. An assembly as in claim 1 wherein said top portion comprises a back panel secured to and depending downwardly from a rear end thereof in substantially parallel relation to said end portion, said back panel extending substantially above said end portion when in said operable position and in overlapping substantially covering relation to said end portion when in said collapsed position.

9. An assembly as in claim 8 further comprising door means formed in said end portion and in said back panel and including a door opening segment formed in each and disposed in aligned relation to one another to define access to an interior of said shelter assembly through said end portion and said back panel.

10. An assembly as in claim 9 wherein said door means further comprises a first door member movably attached to said top portion and selectively positionable into and out of covering relation to said door opening segment therein and a second door member movably connected to said back panel and selectively positionable into and out of covering relation to said door opening segment therein.

11. An assembly as in claim 10 comprising a first door member disposed in covering, overlying relation to said second door opening when said top portion and bottom side wall portion are in collapsed position.

12. An assembly as in claim 11 wherein said first and second door members are each pivotally connected to said top portion and said bottom wall portion respectively and movable relative thereto about an opposite longitudinal side when said top portion and bottom wall portion are in both said collapsed position and said operable portion.

13. An assembly as in claim 4 wherein said top portion comprises a back panel secured to and depending downwardly from a rear end thereof in substantially parallel relation to said end portion, said back panel extending substantially above said end portion within said operable position and in overlapping, substantially covering relation to said end portion within said collapsed position.

14. An assembly as in claim 13 wherein said attachment means further comprises a fourth flange mounted on a lower peripheral edge of said back panel and disposed in overlying relation to said end portion, said fourth flange removably attachable to said end portion adjacent an upper peripheral edge thereof when said top portion is in said operable position.

15. An assembly as in claim 14 wherein said top portion is removably secured to said bottom wall portion substantially continuously along correspondingly positioned respective peripheries thereof.

16. An assembly as in claim 10 wherein said door means includes locking means on each of said first and said second door members, said locking means including a plurality of slide bolt structures, each configured and disposed to slidably move within a hollow bore in said first and second door members.

17. An assembly as in claim 16 wherein said slide bolt structures include handles extending outwardly from said door members, each of said handles including a control shaft attached to said slide bolt structures and slidably disposed with an elongate slot formed in said door members.

18. An assembly as in claim 17 wherein said handles are disposed on opposite sides of each of said first and said second door members.

19. An assembly as in claim 18 wherein said second door members includes a recessed portion on an outer surface surrounding a handle of at least one of said slide bolt structures on an upper half of said second door member to permit movement of said top portion relative to said bottom wall portion between said collapsed position and and said operable position.

20. An assembly as in claim 16 wherein each of said slide bolt structures include a spring mounted within said hollow bore in confronting engagement with an inner proximal end of each of said slide bolt structures forcing a distal end of said slide bolt structures to project outwardly from within said door members into a locked position.

* * * * *